(12) United States Patent
Godbehere et al.

(10) Patent No.: US 7,780,808 B2
(45) Date of Patent: Aug. 24, 2010

(54) METHOD OF REINFORCING A LAMINATED MEMBER SUCH AS A SKIN FOR AN AIRCRAFT

(75) Inventors: Andrew P Godbehere, Winscombe (GB); Stephen Williams, Ebbw Vale (GB)

(73) Assignee: Airbus Operations Limited, Bristol (GB)

( * ) Notice: Subject to any disclaimer, the term of this patent is extended or adjusted under 35 U.S.C. 154(b) by 966 days.

(21) Appl. No.: 10/182,904

(22) PCT Filed: Feb. 6, 2001

(86) PCT No.: PCT/GB01/00469

§ 371 (c)(1),
(2), (4) Date: Aug. 2, 2002

(87) PCT Pub. No.: WO01/58680

PCT Pub. Date: Aug. 16, 2001

(65) Prior Publication Data

US 2003/0021958 A1 Jan. 30, 2003

(30) Foreign Application Priority Data

Feb. 11, 2000 (GB) .................................. 0003029.6

(51) Int. Cl.
*B32B 37/02* (2006.01)
(52) U.S. Cl. ....................................... 156/166; 156/250
(58) Field of Classification Search .................. 156/166, 156/250
See application file for complete search history.

(56) References Cited

FOREIGN PATENT DOCUMENTS

| EP | 0 783 960 A | 7/1997 |
| FR | 2 771 330 A | 5/1999 |
| GB | 2 154 286 A | 9/1985 |
| WO | 00 34031 A | 6/2000 |

*Primary Examiner*—Elizabeth M Cole
(74) *Attorney, Agent, or Firm*—Nixon & Vanderhye P.C.

(57) ABSTRACT

A method of reinforcing a laminated wing skin (10) for an aircraft. The method comprises laying-up a plurality of fibers to form the laminated wing skin (10). A composite reinforcement member (14) is positioned on a surface (16) of the laminated skin (10) and one or more further layers are laid up so as to enclose the composite reinforcing member (14) at a position adjacent one surface of the laminated skin (10).

11 Claims, 1 Drawing Sheet

Fig.1. *PRIOR ART*
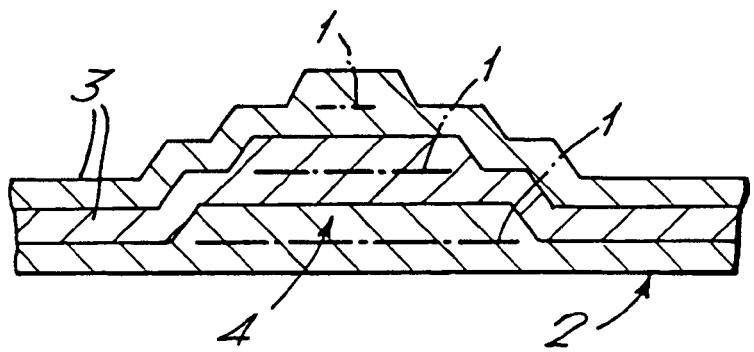
Fig.2.
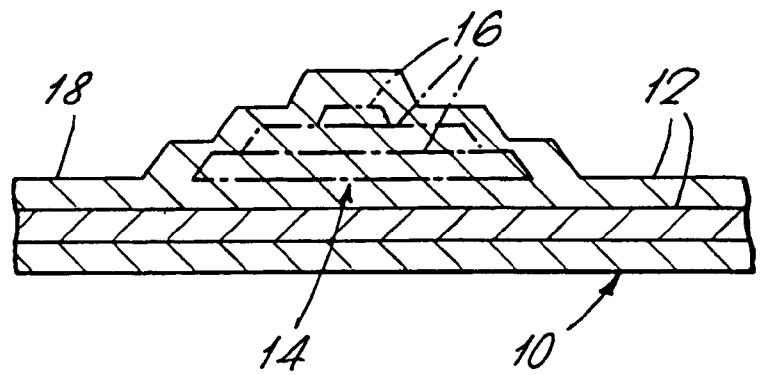
Fig.3.
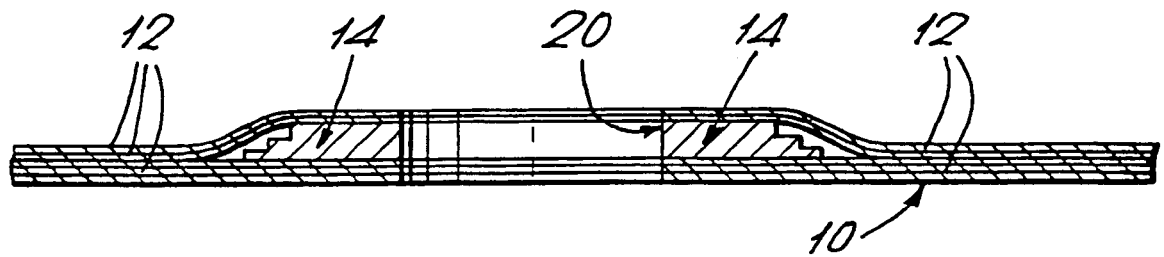

METHOD OF REINFORCING A LAMINATED MEMBER SUCH AS A SKIN FOR AN AIRCRAFT

This application is the US national phase of international application PCT/GB01/00469 filed 6 Feb. 2001, which designated the US.

The invention relates to a method of reinforcing a laminated skin for an aircraft.

An increase in local thickness of aircraft skin is often desirable, particularly to provide reinforcement around an access hole.

FIG. 1 is a cross section of a laminated skin for an aircraft reinforced in a known manner.

Referring to FIG. 1, it is known to add reinforcement plies 1 to a laminated skin section 2 formed from layers 3 in order to increase the local thickness. The plies 1, which are formed from carbon fibre composite, glass fibre or aramid fibres, are generally buried spaced apart between successive layers 3 to define a reinforced area 4.

Where multiple reinforcement plies 1 are inserted between successive layers 3, the multiple layers are effectively displaced from the centroid of the skin section 2 which is not always desirable. Moreover, the separation of successive layers 3 by the reinforcement plies 1 increases the possibility of peel-induced delamination of the skin section 2.

An aim of the invention is to provide an improved method of reinforcing a laminated member for an aircraft.

According to a first aspect of the invention there is provided a method of reinforcing a laminated member such as a skin for an aircraft, the method comprising laying-up a plurality of layers to form part of the laminated member, positioning a composite reinforcement member on a layer of the laminate member and laying-up one or more further layers so as to complete the laying up of the laminated member and enclose the composite reinforcing member at a position adjacent one surface of the completed laminated member.

In that way, instead of providing a plurality of reinforcement members, each being placed between different adjacent layers of the laminated member, only the single composite reinforcement member need be placed between the adjacent layers. Consequently, fewer layers of the laminated member are stepped, thereby making the laminated member more structurally efficient and leading to performance benefits.

The method may include forming the composite reinforcement member from a plurality of layers, preferably at the same time that the laminated member is being produced in a parallel process. In that way, production time can be minimised. The finished composite reinforcement member can then be introduced into the laminated member at a convenient time.

According to a second aspect of the invention there is provided a laminated member such as a skin for an aircraft reinforced using a method according to the first aspect or any of the consistory clauses relating thereto.

A method of reinforcing a laminated skin for an aircraft in accordance with the invention will now be described by way of example and with reference to FIGS. 2 and 3 of the remaining accompanying drawings in which FIG. 2 is a cross section through a laminated skin for an aircraft reinforced by a method in accordance with the invention, FIG. 3 is a cross section through a laminated skin section made in accordance with the invention and having an access hole formed therethrough.

An aircraft wing skin 10 is of laminated form and is made from a lay-up of fibres so as to comprise a plurality of layers 12, each layer being laid in one of several different directions, for example at 0 degrees, 45 degrees and −45 degrees, in known manner.

Referring to FIG. 2, a composite reinforcement member 14 is also made from a lay up of fibres so as to comprise a plurality of layers 16. The layers 16 may be arranged so as to form a reinforcement member 14 which generally tapers towards an inner surface 18 of the wing skin 10.

In some applications, for example when reinforcing access holes in aircraft wing skins, many similar composite reinforcement members 14 are required. In such a case, the composite reinforcement members 14 can be manufactured by an automated dedicated process.

The composite reinforcement member 14 may be produced in parallel with, and preferably at the same time as, the wing skin 10. In that way, the lead-time in manufacturing the wing skin 10 can be significantly reduced.

The composite reinforcement member 14 is positioned on a layer 12 of the wing skin 10 just prior to the end of the wing skin lay-up process. Once the reinforcement member 14 has been placed in position, one or more final layers 12 are added to hold the composite reinforcement member 14 firmly in place beneath and adjacent the inner surface 18 of the wing skin 10. By placing the reinforcement member 14 in the lay-up as described with respect to FIG. 2, manufacturing and design is significantly simplified and associated costs are reduced, together with the risk of delamination when compared to the FIG. 1 arrangement. Moreover, fewer layers 12 are stepped from the centroid of the wing skin 10 than in the FIG. 1 arrangement, thereby making the skin more structurally efficient.

Referring to FIG. 3, once the wing skin lay-up process is completed, an access hole 20 may be formed through the composite reinforcement member 14 and layers 12 of the wing skin 10.

The composite reinforcement member 14 may be made using a variety of technologies including pre peg, woven, braided, pultruded or any other applicable technology.

Whilst specific reference has been made to a laminated skin of an aircraft, the invention could be applied to laminated ribs or spars or another member for an aircraft.

The invention claimed is:

1. A method of reinforcing a laminated member for an aircraft, the method comprising:
   laying-up a plurality of layers to form part of the laminated member;
   forming a composite reinforcement member from a plurality of layers;
   after said forming step, positioning the composite reinforcement member on said part of the laminated member; and
   laying-up at least one further layer so as to complete the laying up of the laminated member and enclose the composite reinforcing member at a position adjacent one surface of the completed laminated member.

2. A method according to claim 1, in which the method includes forming the composite reinforcement member at the same time as the laminated member is produced in a parallel process.

3. A method according to claim 1, in which the method includes forming an access hole through a part of the laminated member which is reinforced by the composite reinforcement member.

4. A method of reinforcing a laminated member for an aircraft, the method comprising:

laying-up a plurality of composite parallel layers to form part of the laminated member, said parallel layers providing maximum tensile strength;

forming a composite reinforcement member from a plurality of layers;

positioning the composite reinforcement member on said part of the laminated member; and laying-up at least one further layer so as to complete the laying up of the laminated member and enclose the composite reinforcing member at a position adjacent one surface of the completed laminated member.

5. A method according to claim 4, in which the method includes forming the composite reinforcement member at the same time as the laminated member is produced in a parallel process.

6. A method according to claim 4, in which the method includes forming an access hole through a part of the laminated member which is reinforced by the composite reinforcement member.

7. A laminated member for an aircraft reinforced using a method according to claim 4.

8. A method of reinforcing a laminated member for an aircraft, the method comprising:

laying-up a plurality of composite parallel layers to form part of the laminated member, said parallel layers providing maximum tensile strength;

forming a composite reinforcement member from a plurality of layers;

after said forming step, positioning the composite reinforcement member on said part of the laminated member; and laying-up at least one further layer so as to complete the laying up of the laminated member and enclose the composite reinforcing member at a position adjacent one surface of the completed laminated member without compromising the tensile strength of said part of said laminated member.

9. A method according to claim 8, in which the method includes forming the composite reinforcement member at the same time as the laminated member is produced in a parallel process.

10. A method according to claim 8, in which the method includes forming an access hole through a part of the laminated member which is reinforced by the composite reinforcement member.

11. A laminated member for an aircraft reinforced using a method according to claim 9.

* * * * *